United States Patent [19]

Christy

[11] 4,024,840
[45] May 24, 1977

[54] ENGINE AND COMPRESSOR ARRANGEMENT

[76] Inventor: Charles Albert Christy, 201 Airport Drive, Farmington, N. Mex. 87401

[22] Filed: Oct. 10, 1975

[21] Appl. No.: 621,567

[52] U.S. Cl. .............................. 123/8.41; 418/241; 418/265

[51] Int. Cl.² ......................................... F02B 53/00

[58] Field of Search .............. 123/8.41, 8.23, 8.25, 123/8.43, 8.45, 8.49; 418/13, 241, 261, 265

[56] References Cited

UNITED STATES PATENTS

| 1,306,699 | 6/1919 | Johanson | 123/8.41 |
| 1,661,593 | 3/1928 | Bodker | 123/8.41 |
| 3,103,920 | 9/1963 | Georges | 123/8.41 |
| 3,213,838 | 10/1965 | Douroux | 123/8.41 |
| 3,324,840 | 6/1967 | Linn | 123/8.41 |
| 3,537,432 | 11/1970 | Jordaan | 123/8.41 |
| 3,595,210 | 7/1971 | Lampis | 123/8.41 |

Primary Examiner—Clarence R. Gordon
Attorney, Agent, or Firm—Karl W. Flocks

[57] ABSTRACT

Vane type rotary combustion engine in combination with a compressor apparatus for supplying a charge of air or an air-fuel mixture to the engine. The engine and compressor are drivingly connected to each other and include a conduit connecting the compressed charge outlet of the compressor to the intake port of the engine so that a compressed charge may be led into the engine. The engine includes a rotary-vane assembly wherein a series of rotatable chambers are provided therein, with a rotatable combustion chamber of relatively low volume rotating past the intake port. A timed valve closes the intake port after which ignition of the charge in the combustion chamber takes place and effects a power stroke against a rotary-slide vane. A continuous succession of power strokes are effected by successive rotary combustion chambers formed by rotary-slide vanes.

10 Claims, 6 Drawing Figures

ENGINE AND COMPRESSOR ARRANGEMENT

BACKGROUND OF THE INVENTION

This invention relates to an improved engine arrangement of the rotary-vane type and in particular one in combination with a compressor apparatus adapted to supply a compressed charge of air or air-fuel mixture to the engine.

SUMMARY OF THE INVENTION

According to the present invention a novel combustion engine arrangement is provided in combination with a compressor apparatus for supplying a compressed charge of air or air-fuel mixture to the engine for combustion therein to produce prime mover results.

One important object of the present invention is to provide an improved engine arrangement wherein cumulative power thrusts are effected in rapid succession against a rotor.

Another object of the invention is to provide an engine wherein combustion takes place in a single combustion zone.

A further object of this invention is to provide an improved engine in which combustion of a compressed charge is effected upon admission thereof into the combustion and closing of the intake valve.

Still another object of the present invention is to provide an improved engine arrangement of the rotary-vane type directly drivingly connected with a compressor apparatus for supplying a compressed air or air-fuel charge to the engine.

Yet another object of the present invention is to provide an engine-compressor arrangement that is simple, but yet capable of significantly high power output considering its size and weight.

In carrying forth the objectives of the present application a rotary-vane engine is directly connected either by suitable gearing or by a single integral shaft extending from the engine to a compressor apparatus connected thereto to supply a compressed air or air-fuel mixture to the engine.

As mentioned heretofore, the engine of the present invention is of the rotary-vane type and in particular is formed with a housing having a cavity extending therethrough, which cavity includes a first generally cylindrical channel portion and a second generally cylindrical channel portion. The two generally cylindrical channel portions are of equal radii, but have the respective centers of curvature spaced apart from each other so that one of the generally cylindrical channel portions is provided with a rotor concentric therewith and for rotation therein. The rotor is formed with a plurality of circumferentially-spaced radial slots therein. A vane having rotary-slide action is disposed in each of the radial slots of the rotor and is constrained to rotate along with the rotor by the slot and to slide in and out of the slot or be held retracted within the slot. The vanes are adapted to move out of the slots against the channel portion that is spaced apart from the channel portion in which the rotor is disposed to thereby form a series of rotating chambers into which a combustible charge is introduced and ignited to effect a power stroke against a vane. The ignited charge after effecting a power stroke is then moved toward an exhaust port and ultimately discharged through the exhaust port.

The compressor apparatus used in the present arrangement is somewhat similar in construction to the engine, but is considerably smaller in size. Like the engine of the present invention, the compressor apparatus is of the rotary-vane type and is provided with a housing having a cavity extending therethrough. Also like the engine of the present invention, the cavity of the compressor apparatus includes a first generally cylindrical channel portion and a second generally cylindrical channel portion of equal radii formed on spaced apart centers. A concentric rotor is disposed in one of the channel portions of the compressor for rotation therein. The compressor rotor like the engine rotor also includes a plurality of circumferentially-spaced radial slots with vanes having rotary-slide action disposed therein to operate in a manner similar to the rotary-slide vanes of the engine. The vanes of the compressor form a plurality of rotating chambers including a compression zone with inlet and discharge outlets for incoming charges and compressed charges, respectively.

As noted heretofore, the compressor apparatus of the present invention is directly drivingly connected to the engine associated therewith and the charge compressed in the compressor is led directly into the engine combustion zone for immediate ignition thereof to obtain a power stroke from the explosive force thereof.

BRIEF DESCRIPTION OF THE DRAWINGS

With an aim toward better understanding of the present invention, reference is now made to the drawings in which.

DETAILED DESCRIPTION OF THE INVENTION

Figure 1:
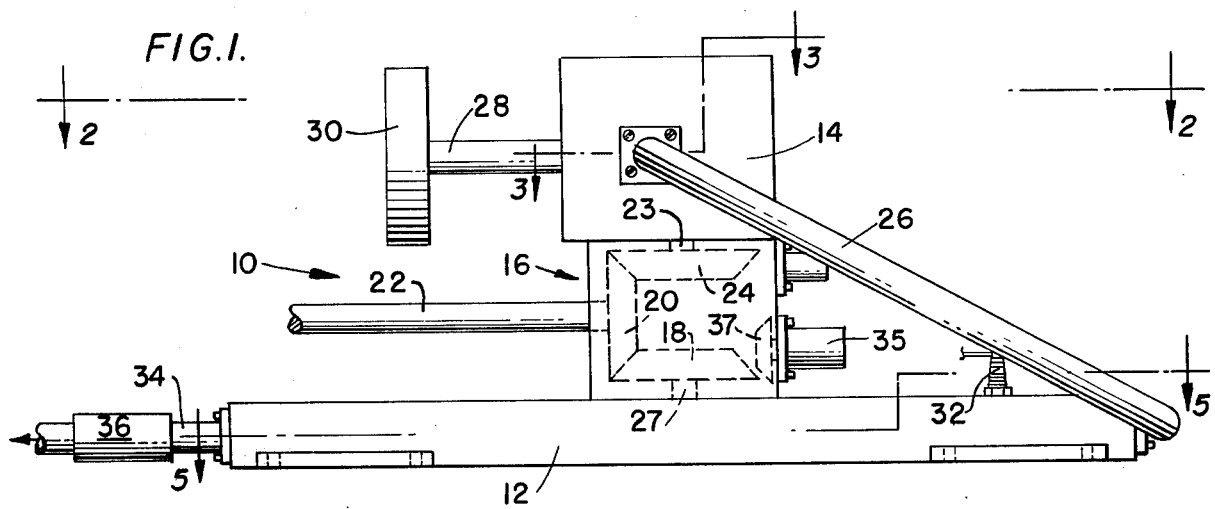
FIG. 1 is an elevational view showing the general arrangement of the engine-compressor combination constituting the present invention.
Figure 2:
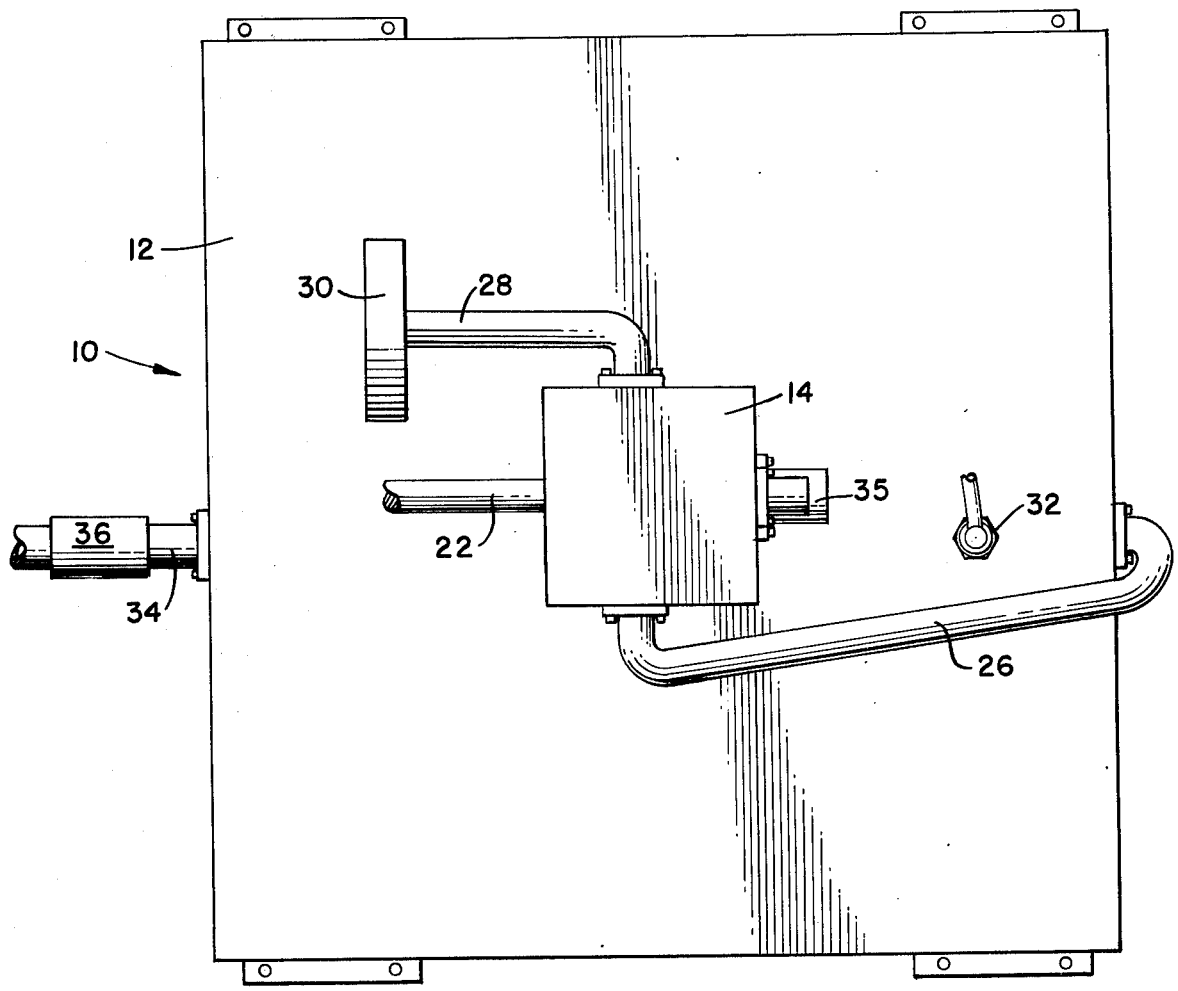
FIG. 2 is a view of the invention taken along section 2—2 in FIG. 1 and looking in the direction of the arrows.

Looking now in detail at the drawings it is seen in FIGS. 1 and 2 that the new and improved engine and compressor arrangement 10 according to the present invention comprises an engine 12 with a compressor 14 disposed thereover. Interposed between engine 12 and compressor 14 is means 16 drivingly connecting engine 12 and compressor 14. The connecting means 16 as seen in FIG. 1 is a transmission 16 comprising an engine bevel gear 18 meshing with output bevel gear 20 which in turn is in mesh with compressor bevel gear 24. Bevel gears 18, 20 and 24 are rigidly connected to engine shaft 27, output shaft 22 and compressor shaft 23, respectively, to effect driving connection between engine 12 and compressor 14. To turn engine 12 over, a starting motor 35 having a bevel gear 37 for meshing with engine bevel gear 18, is located to one side of engine bevel gear 18. With the transmission as described, it is clear that engine 12 and compressor 14 are drivingly connected thereby so that as engine 12 is turned over and started, compressor 14 is also driven. Instead of the transmission 16 to drivingly connect engine 12 and compressor 14 together, it is clearly within the contemplation of the present invention to have a single shaft extending directly form engine 12 to compressor 14.

Engine 12 and compressor 14 in addition to being drivingly connected are also connected to each other by way of conduit 26 whereby a charge of compressed air or airfuel mixture may be led from compressor 14 to engine 12.

Other elements supporting operation of engine 12 include a fresh air intake pipe 28 with an air filter 30 mounted on compressor 14, a spark plug 32 disposed at the combustion zone of engine 12, and an exhaust pipe 34 with muffler 36 at the exhaust end of engine 12.

Figure 3:
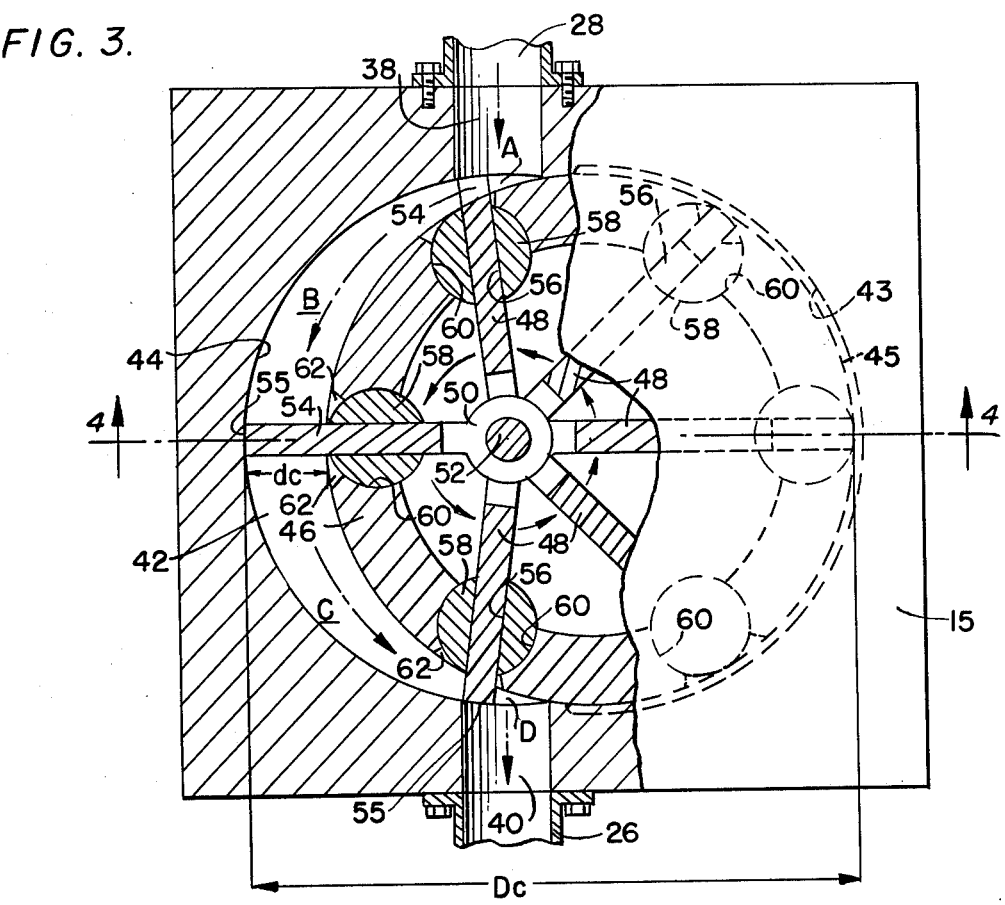
FIG. 3 is a view taken along section 3—3 in FIG. 1, looking in the direction of the arrows, and in which details of a compressor apparatus may be readily seen.
Figure 4:
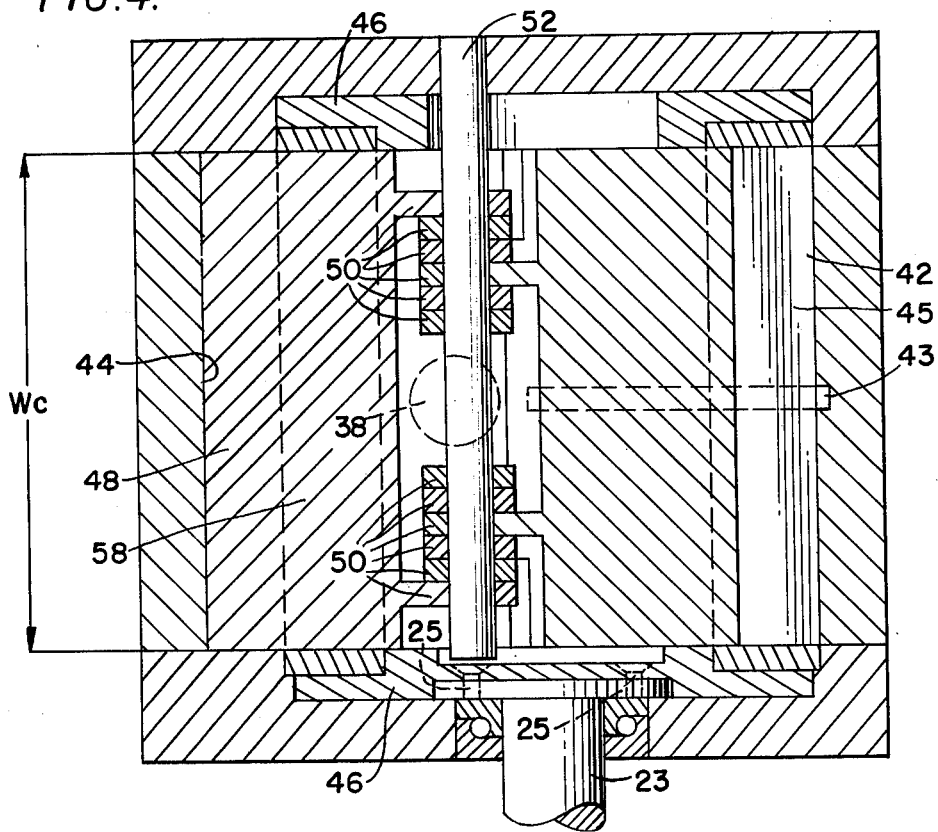
FIG. 4 is a view taken along section 4—4 in FIG. 3, and looking in the direction of the arrows.

Details of compressor 14 are clearly illustrated in FIGS. 3 and 4 in which it is seen that an inlet port 38 and an outlet port 40 are provided on opposite sides of housing 15 of compressor 14. Extending between and normal to inlet and outlet ports 38, 40 is a cavity or hollow space 42 formed by a pair of channel portions 44, 45 each of which is generally cylindrical and of the same diameter, but having spaced-apart centers of curvature. Interposed within hollow space 42 is a generally cylindrical rotor 46 which is generally concentric with channel portion 45 so that the outer surface 47 of rotor 46 generally conforms to the surface of channel portion 45. Rotor 46 is also formed with a plurality of circumferentially spaced radially open sockets 60 each of which contains an oscillating guide 58. A journal shaft 52 is supported at one side of compressor 14 and extends into rotor 46. Rotatably supported on journal shaft 52 are a plurality of rotary-slide vane or blade members 48 having a hub portion 50. Each vane or blade 48 extends through a slot 56 in guide 58. An outer end 54 of each vane or blade 48 is adapted to move in and out of slot 56. The outer tip 55 of each vane 48 conforms to the surface of channel 44 by reason of the fact that journal shaft 52 is at the center of the cylinder outlined by channel 44. Notches 62 are formed on opposite sides of each socket 60 to allow for oscillation of vane or blade members 48. Intake pipe 28 and conduit 26 are connected to inlet and outlet ports 38 and 40, respectively. To facilitate radial movement of blades 48, a circumferential groove 43 is provided in channel portion 45 to allow communication between slots 56 of idling blades 48 to prevent drawing a vacuum therein. Groove 43 terminates short of inlet and outlet ports 38 and 40, respectively.

Figure 5:
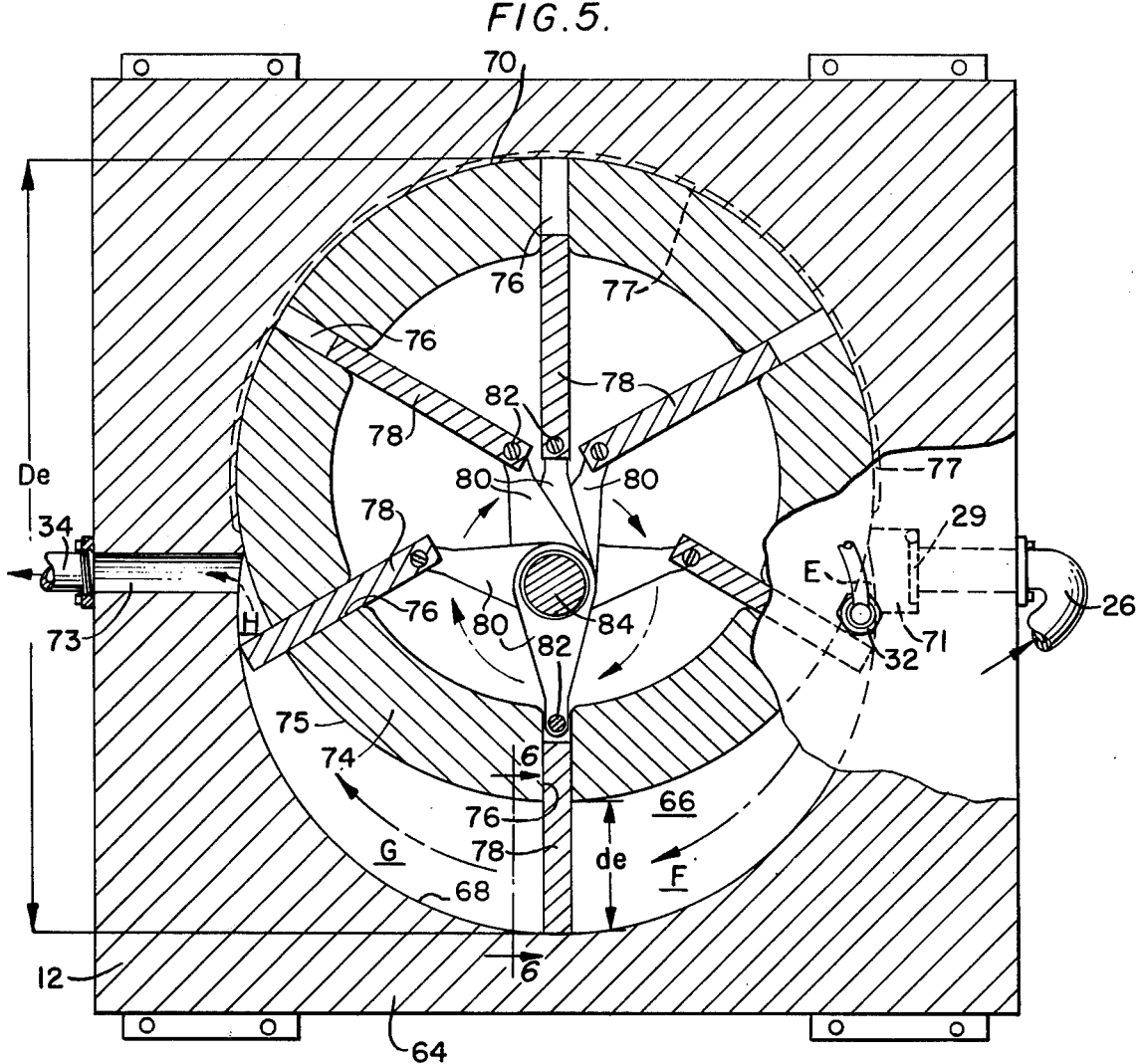
FIG. 5 is a view taken along section 5—5 in FIG. 1, looking in the direction of the arrows, and in which details of the engine according to the present invention may be readily seen.
Figure 6:
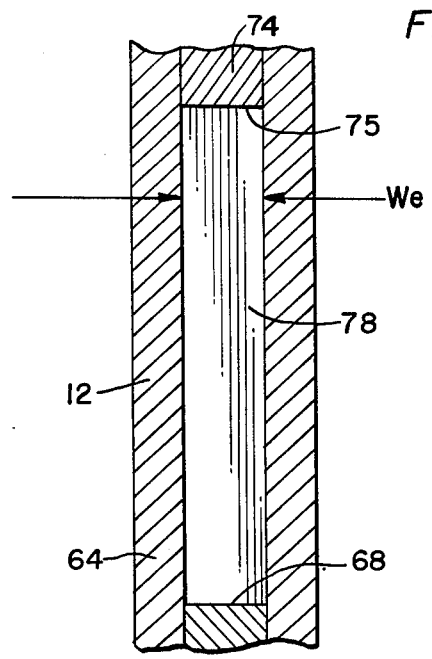
FIG. 6 is a view taken along section 6—6 in FIG. 5, looking in the direction of the arrows, and in which rotary-vane details of the engine may be readily seen.

Details of engine 12 are illustrated in FIGS. 5 and 6 from which it is clearly seen that engine 12 is a rotary engine with rotary-slide members therein. The rotary engine 12, which, as described heretofore, has a conduit 26 and an exhaust pipe 34 connected to it. The conduit 26 is connected to engine 12 at one side of engine housing 64 to an intake port 71 and exhaust pipe 34 is connected to an exhaust port 73 on a side opposite to intake port 71. Extending between and normal to intake and exhaust ports 71, 73 is a cavity 66 formed by a pair of channels 68, 70 each of which is generally cylindrical and of the same diameter, but having spaced-apart centers of curvature. Interposed within cavity 64 is a generally cylindrical rotor 74, which is generally concentric with channel 70 so that the outer surface 75 of rotor 74 generally conforms to the surface of channel 70. Rotor 74 is also formed with a plurality of circumferentially spaced radial openings or slots 76. A fixed journal 84 extends into rotor 74 in a manner similar to that which journal shaft 52 extends as described above in connection with compressor 14. A plurality of rotary-slide blades or vanes 78 extend into slots 76 and are constrained to slide therein and rotate therewith. Each blade 78 is hingedly connected at its radially inner end to a connecting link 80 by a pivot pin 82. Each connecting link 80 is rotatably supported on fixed journal 84 so as to rotate thereabout and control radial movement of blade 78. An intake valve 29 is provided in intake port 71 to permit entry of a combustible charge and prevent backfire.

To prevent drawing a vacuum on the idle side of engine cavity 66 a circumferential groove 77 is formed in channel 70. Groove 77, which terminates short of intake and exhaust ports 71 and 73, respectively, provide communication between slots 76 in the idle portion of the engine.

OPERATION OF THE INVENTION

With further reference to the above drawings, operation of applicant's invention is achieved in having available the necessary air and fuel and turning engine 12 over as by starter motor 35 which rotates the rotors 46 and 74 of compressor 14 and engine 12, respectively. Once the rotor 46 of compressor 14 is turned a charge of fresh air or of air-fuel mixture drawn in through inlet port 38 into zone A which follows outer end 54 of blade 48 in the direction of the arrows through a transfer zone B, to a compressing zone C, to fully compressed zone D and through conduit 26. Rotor 48 of compressor 14 and valve 29 are timed so that valve 29 is closed during the travel of blade 48 through zones C and D. Rotor 74 of engine 12 is timed with respect to valve 29 so that as each vane 78 rotates to form zone E just past intake port 71 the valve 29 opens to admit a compressed charge through intake port 71 from conduit 26. Valve 29 is then closed and the charge is ignited by a spark from spark plug 32. As valve 29 is closed the next charge is compressed and led into conduit 26. With the compressor 14 and engine 12 being drivingly connected and both having the same number of work zones, it is readily seen that once the compressor and engine are properly timed with the valve, the timing which may be achieved in any known way, operation will proceed without difficulty.

It is clear that upon ignition of the charge in intake-combustion zone E of FIG. 5 the explosive force of ignition of the charge will cause gas pressure to urge vane 78 adjacent to spark plug 32 to move clockwise in the direction of the arrows. As the gas expands through power-expansion zone F, ignition takes place in the following zone E formed by the next vane 78. As a continuous series of ignitions takes place the cumulative torque generated becomes quite appreciable. Zone G provides an exhaust transfer zone and H is seen to be an exhaust zone from which exhaust passes through exhaust port 73 and may be carried away through exhaust pipe 34.

While compressor 14, as seen in FIGS. 3 and 4, and engine 12, as seen in FIGS. 5 and 6, appear to be approximately of the same general size, it is noted that they may be in any suitable proportions and reference is made to FIGS. 1 and 2 to show comparative sizes that have been contemplated. In a preferred embodiment of the engine and compressor arrangement of the present invention, the distances $D_c$ is about 12 inches, $d_c$ is about 2 inches, and $W_c$ is about 12 inches as measured on compressor 14 in FIGS. 3 and 4 compared to distances $D_e$ of about 5 feet, $d_e$ of about 12 inches, and motor e of about 2 inches as measured in the engine 12 of FIGS. 5 and 6.

While not illustrative, it is clear that a charge accumulator and/or injection mechanism may be provided in conduit 26 just upstream of valve 29.

It is to be understood that the invention is not limited to the embodiments disclosed above which are illustratively offered, and that modifications may be made without departing from the scope of the invention.

What is claimed is:

1. A rotary engine in combination with a compressor apparatus for supplying a charge of air or an air-fuel mixture to said engine, said engine comprising an enclosed housing having a cavity extending therein, said cavity including two cylindrical portions having spaced-apart centers but having substantially equal radii of curvature, a rotor disposed in said cavity and rotatably supported in said housing for rotation about an axis coaxial with the center of a first one of said two cylindrical portions, said rotor having a plurality of radial openings therein, vane means disposed in each of said radial openings for sliding movement therein and rotary movement along with said rotor, an intake port and an exhaust port communicating with said cavity, said intake port being separated from said exhaust port by said two cylindrical portions, a second cylindrical portion of said cavity forming a circumferential channel extending from said intake port to said exhaust port, said channel in operation of said engine forming with said rotor and vane means thereof a plurality of rotating chambers moving from an intake-combustion zone to at least a power-expansion zone and an exhaust zone, said vane means extending radially outwardly of said rotor in pressure sealing relationship with said channel, said first cylindrical portion of said cavity providing an idle cycle downstream of said exhaust port and between said exhaust port and said intake port over which said rotor passes with said vane means retracted within said rotor and a circumferential groove extending in said first cylindrical portion to provide communication between radial openings simultaneously passing said first cylindrical portion to relieve pressure therein and thereby to facilitate radial movement of said vane means, said compressor apparatus comprising a casing having a hollow space extending therethrough and a rotary member disposed in said hollow space, air inlet and compressed charge outlet, means drivingly connecting said rotary member of said compressor apparatus to said rotor of said engine, conduit means connecting said compressed charge outlet of said compressor apparatus to said intake port of said engine, timed valve means disposed in said intake port cyclically opening to admit a charge into each of said rotating chambers as each of said chambers is passing through the air intake-combustion zone, ignition means disposed in said intake-combustion zone to ignite said charge upon closing of said valve means and thereby effecting a power stroke on said vane means.

2. The engine combination as defined in claim 1 wherein said compressor apparatus is of the rotary type and the rotary member thereof includes a plurality of circumferentially-spaced radial openings or slots with vane elements constrained to rotate therewith and slide therein.

3. The engine as defined in claim 2 wherein said compressor has the same number of radial openings as said engine has radial openings.

4. The engine as defined in claim 3 wherein said vane means of said engine comprise a plurality of rotary-slide elements of which one is disposed in each radial opening of said engine.

5. The engine as defined in claim 4 wherein a connecting link is hingedly connected to each of said rotary-slide elements to control radial movement of said rotary-slide elements.

6. The engine as defined in claim 5 wherein each of said connecting links is rotatably supported on a fixed journal.

7. The engine as defined in claim 6 wherein each of said vane elements of said compressor is rotatably supported on a fixed support to control radial movement of said vane elements.

8. The engine as defined in claim 7 wherein said compressor includes a circumferentially extending pressure relief groove communicating between radial openings of said compressor passing through an idle portion of the operation thereof.

9. The engine as defined in claim 3 wherein each of said vane elements of said compressor is rotatably supported on a fixed support to control radial movement of said vane elements.

10. The engine as defined in claim 9 wherein said compressor includes a circumferentially extending pressure relief groove communicating between radial openings of said compressor passing through an idle portion of the operation thereof.

* * * * *